(12) United States Patent
Brassfield

(10) Patent No.: US 7,267,077 B1
(45) Date of Patent: Sep. 11, 2007

(54) ANIMAL HOUSE

(75) Inventor: Brian Brassfield, Miami, OK (US)

(73) Assignee: Blitz/U.S.A., Inc., Miami, OK (US)

( * ) Notice: Subject to any disclaimer, the term of this patent is extended or adjusted under 35 U.S.C. 154(b) by 0 days.

(21) Appl. No.: 10/926,135

(22) Filed: Aug. 25, 2004

(51) Int. Cl.
*A01K 29/00* (2006.01)

(52) U.S. Cl. .................................... 119/28.5

(58) Field of Classification Search ........... 119/28.5, 119/482, 496, 512, 513
See application file for complete search history.

(56) References Cited

U.S. PATENT DOCUMENTS

| | | | |
|---|---|---|---|
| 1,754,590 A * | 4/1930 | Allen | 119/482 |
| 2,980,058 A * | 4/1961 | Hoffman | 119/482 |
| 3,215,387 A * | 11/1965 | Thomspon | 5/9.1 |
| 4,084,276 A * | 4/1978 | Trexler et al. | 5/9.1 |
| 4,688,281 A | 8/1987 | Lantz | |
| 4,696,259 A | 9/1987 | Fewox | |
| 4,996,944 A | 3/1991 | Zook | |
| 5,072,694 A | 12/1991 | Haynes et al. | |
| 5,154,137 A * | 10/1992 | Stanaland | 119/496 |
| 5,551,371 A * | 9/1996 | Markey et al. | 119/482 |
| 5,575,239 A | 11/1996 | Bradburn et al. | |
| 5,937,792 A | 8/1999 | Madrid | |
| 6,267,080 B1 | 7/2001 | Roy | |
| 6,397,778 B1 | 6/2002 | Tripp | |
| 6,439,165 B1 * | 8/2002 | Guard | 119/496 |
| 6,513,456 B2 | 2/2003 | Sherman et al. | |
| D485,649 S | 1/2004 | Fick | |
| 2002/0100431 A1 | 8/2002 | Sherman et al. | |

* cited by examiner

*Primary Examiner*—Thomas Price
(74) *Attorney, Agent, or Firm*—McAfee & Taft

(57) ABSTRACT

An improved animal house with a bed. The bed is an elevated bed that is mounted in the animal house to define a space between the floor of the animal house and the bed. The animal house has an upper portion and a base portion that are connectable to one another and the bed is preferably mounted in the base portion of the animal house. The bed has a support frame which includes a plurality of support frame members connected to one another and a flexible sheet of material supported by the support frame.

15 Claims, 6 Drawing Sheets

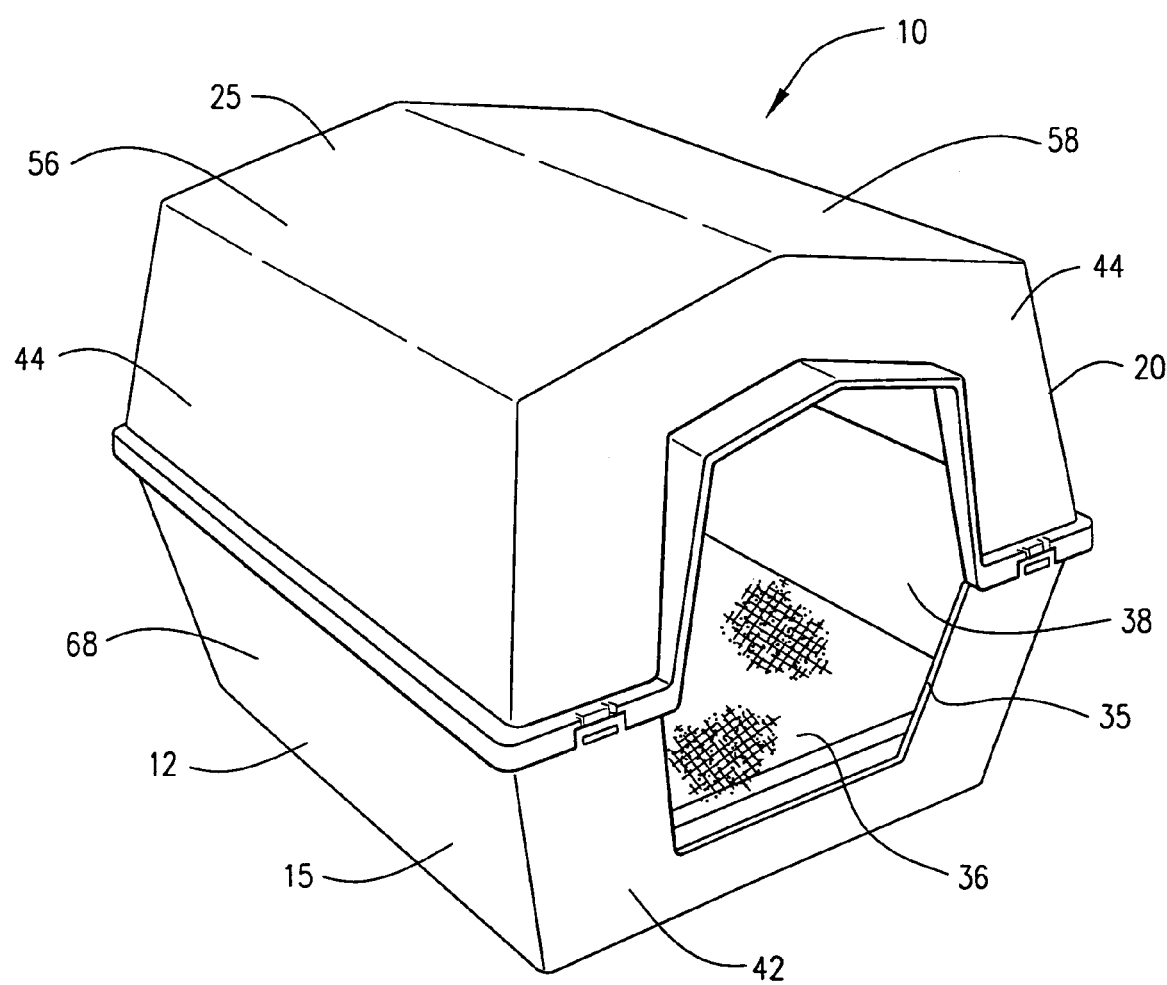
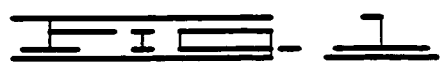

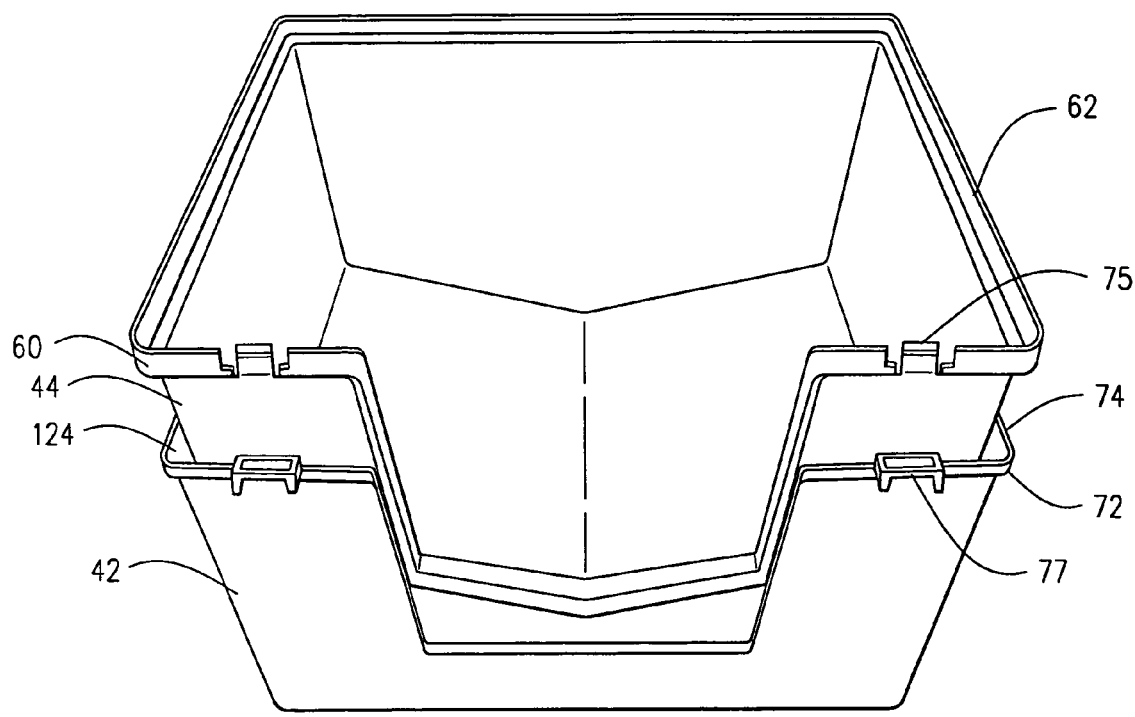
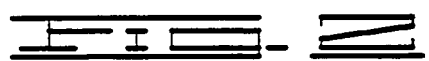

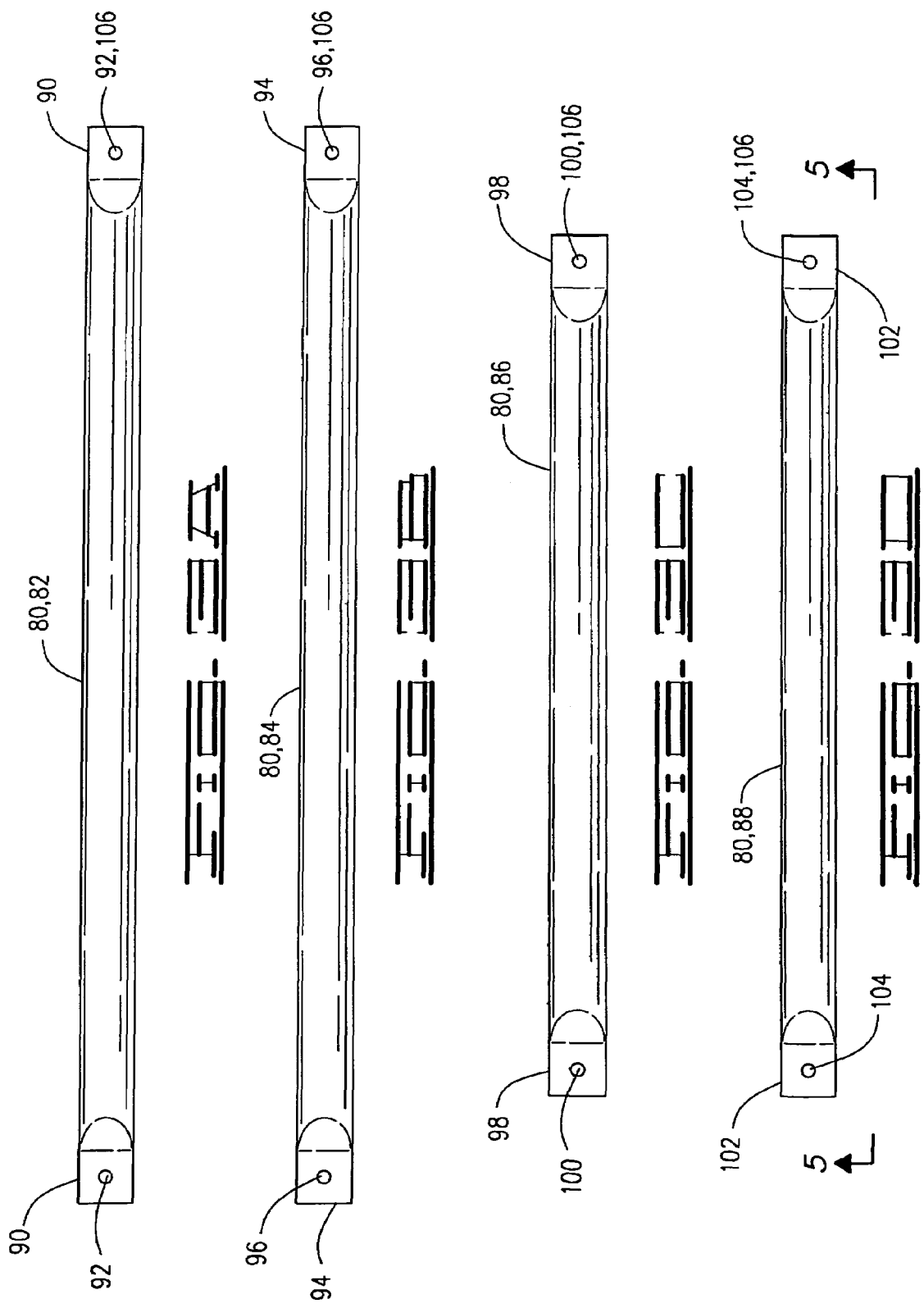

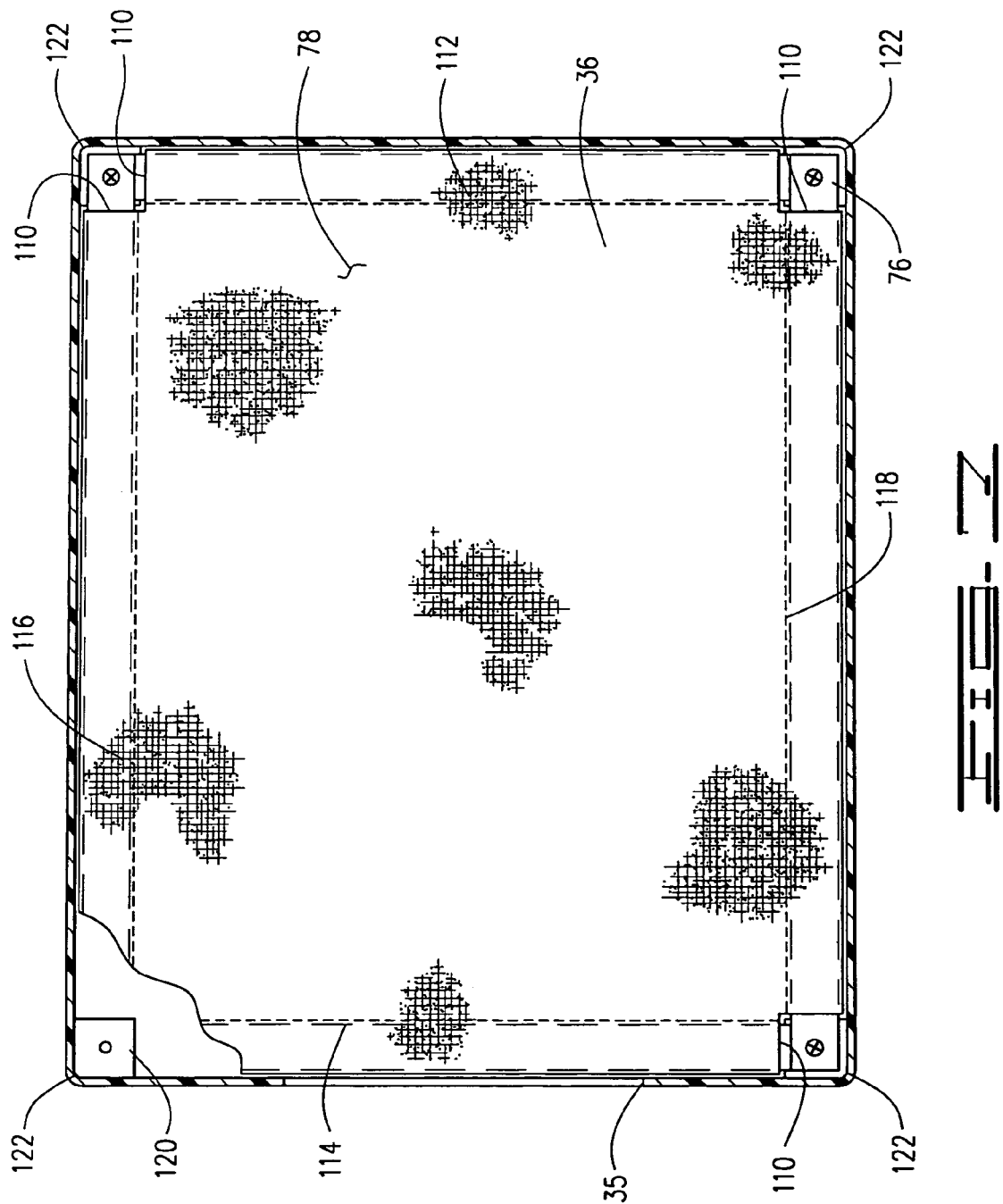

ANIMAL HOUSE

BACKGROUND OF THE INVENTION

There are a number of different types of animal shelters, houses and enclosures utilized for pets. Animal owners are continually seeking new types of enclosures that are easily constructed, and that provide maximum comfort for their pets. There are several products on the market that provide comfort and shelter for animals, including a variety of plastic shelters/houses that provide a space for an animal. There are likewise a number of products on the market which provide for additional comfort of an animal, such as pillows and beds intended to be placed on and supported by a ground surface. Animals, and specifically dogs, often seek an elevated location in which to rest. There is, therefore, a need for an animal enclosure that will provide not only space for the animal to rest and/or sleep, but will provide an additional comfort level for the animal and will provide an elevated surface on which the animal can rest.

SUMMARY OF THE INVENTION

The current invention is directed to an animal house with a suspended or elevated bed, and more specifically for a suspended or elevated bed in a doghouse. The elevated bed may comprise a support frame with a flexible sheet of material supported by the support frame. The support frame is positioned above a floor of a doghouse in the interior of the doghouse, and in one embodiment may be mounted to the doghouse. The floor of the doghouse may comprise a floor that is attached to, and is a part of the doghouse, or may comprise a surface upon which the doghouse is placed, such as a ground surface. The bed is positioned in the doghouse so that a space is defined between the bed and the floor of the doghouse so that an animal, such as a dog, resting on the bed will be resting on a suspended or elevated surface. The support frame is located above the floor, and may be mounted to the doghouse using fasteners or other fastening methods known in the art. The support frame may be comprised of a plurality of longitudinal frame members connected to one another at the ends thereof. The frame members may be positioned in pockets located at the edges of the flexible sheet of material. The flexible sheet of material will be stretched sufficiently when the bed is placed in the doghouse so that the flexible sheet of material will provide an ample support surface that will flex to provide comfort, but will also be strong enough to provide support for the animal. The flexible sheet of material may be comprised of, for example, but not limited to a canvas material.

The animal house may be a plastic house which may comprise for example an upper or top portion and a lower or base portion. The upper portion and base portion may be connected to one another and are separable. The floor of the doghouse may be connected to the base portion, and in a preferred embodiment may be integrally formed with the base portion. In a separated, or disassembled condition, the upper portion may be inverted, or turned upside down and will nest in the base portion. The bed may be disconnected from the house and may be stored between the upper portion and the base portion when the upper portion is nested in the base portion. Thus, the current invention may comprise a kit for assembling a doghouse comprising a base portion with a floor, an upper portion nestable in the base portion in a disassembled condition and a bed that may be mounted to the doghouse.

BRIEF DESCRIPTION OF THE DRAWINGS

FIG. 1 is a perspective view of the animal house of the current invention.

FIG. 2 is a view of the animal house of the current invention showing the upper portion nested in the base portion of the animal house.

FIGS. 3A-3D are top views of frame members of the bed.

FIG. 6 is a section view from line 6-6 of FIG. 5.

FIG. 7 is a section view from line 7-7 of FIG. 5.

DESCRIPTION OF THE PREFERRED EMBODIMENT

Figure 4:
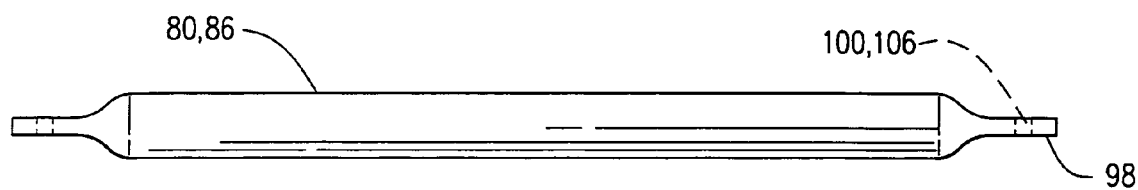
FIG. 4 is a side view of one frame member.
Figure 5:
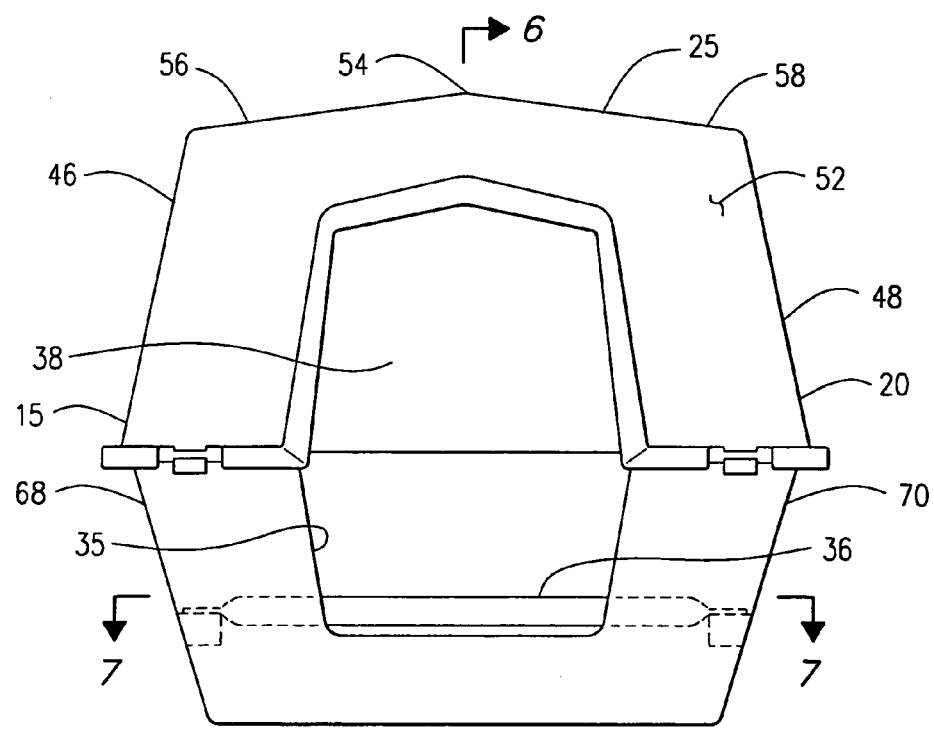
FIG. 5 is a front view of the animal house of the current invention.
Figure 5:
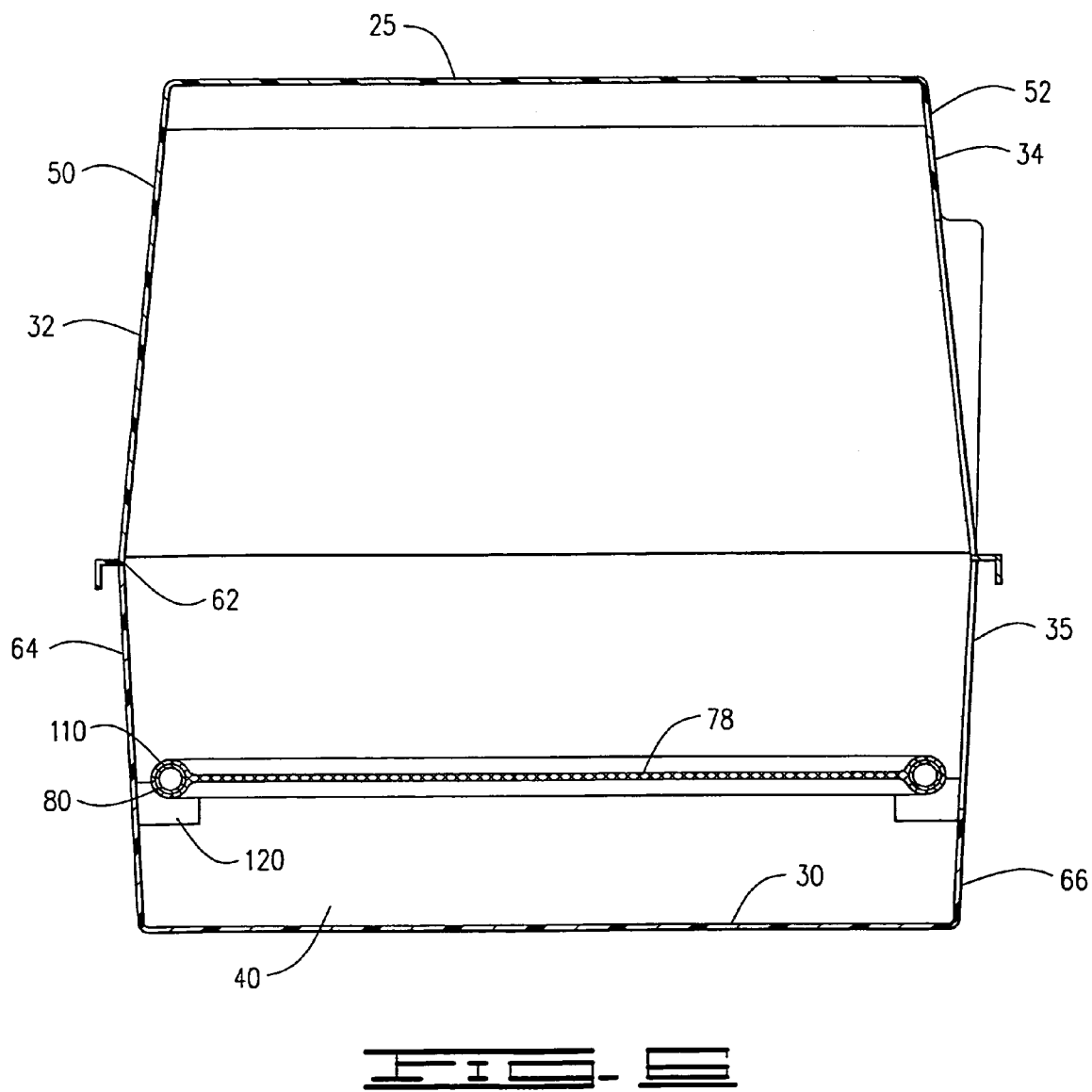

Referring now to the figures, an animal house or animal enclosure 10 has outer wall 12, which may comprise left or first side wall 15, and right or second side wall 20. Animal house 10 may also include top, or roof 25 and floor or bottom 30. Animal house 10 may be a doghouse and may be referred to herein as doghouse 10, but may also be a house for other types of pets. Outer wall 12 may further comprise a rear or back side wall 32 and a forward or front side wall 34. An opening 35 for ingress and egress is provided at forward side 34 of animal house 10. Roof 25, and walls 15, 20, 32 and 34 may be solid walls to protect an animal therein from the surrounding environment. Walls 15 and 20 are connected to walls 32 and 34, and walls 15, 20, 32 and 34 are connected to roof 25 and floor 30. Thus, animal house 10 may be used inside or outside, and will provide protection from the elements, such as wind, rain, snow and sun. The roof and walls of animal house 10 will repel rain and snow, and will provide shade as well. An elevated or suspended bed 36 is positioned in an interior 38 of animal house 10 and is positioned above floor 30 so that a space 40 is defined between suspended bed 36 and floor 30.

In the embodiment shown, animal house 10 comprises a two-piece outer construction which includes a bottom or base portion 42 and an upper portion or top portion 44. There are a number of known latching and/or connecting methods utilized for connecting upper portion 44 to base portion 42. Floor 30, in the embodiment shown, is a part of the doghouse 10, and preferably integrally formed as a part of base portion 42, but may be a ground surface upon which a doghouse with front, side and rear walls may be placed.

Upper portion 44 comprises top or roof 25, first or left, and second or right-hand side walls 46 and 48, respectively, rear wall 50 and forward wall 52. Top 25 comprises a crest 54 with first and second roof surfaces 56 and 58 which slope downwardly and outwardly from crest 54 and intersect with first and second side walls 46 and 48. A flange 60 may be defined at the lower end, or lower edge 62 of upper portion 44. Left and right side walls 46 and 48 taper outwardly from the point at which they intersect roof surfaces 56 and 58, respectively, to lower end 62. Rear wall 50 and forward wall 52 may likewise comprise tapered walls that taper outwardly from top 25.

Base portion 42 comprises floor 30, rear wall 64 extending upwardly therefrom, forward wall 66 extending upwardly therefrom and first, or left and second, or right side walls 68 and 70, respectively, extending upwardly therefrom. Walls 64, 66, 68 and 70 may comprise tapered walls that taper upwardly and outwardly from floor 30. A flange 72 may be defined at the upper end or upper edge 74 of base portion 42. Upper portion 44 and base portion 42 may be connected by any means known in the art, such as for example, a snap-and-receptacle arrangement. Snaps 75 on upper portion 44 may be received in receptacles 77 defined on base portion 42. Only two snaps and receptacles are shown, but it is understood that any number of snaps and receptacles may be used, and that other connecting arrangements are possible.

Bed 36 is positioned in animal house 10 so that it is elevated above floor 30. In the preferred embodiment bed 36 is positioned in animal house 10 in base portion 42 above floor 30. Bed 36 is preferably mounted to animal house 10 above floor 30 in base portion 42. Bed 36 will be sized appropriately for the size of the animal house in which it is to be mounted, and preferably is sized so that the edges of the bed are near the walls of the animal house. The edges are preferably close enough to the wall to prevent a dog, or other animal, from fitting between the bed 36 and the walls of the doghouse, and preferably will be close enough to prevent the foot of an animal from slipping therebetween. Bed 36 may comprise support frame 76 and a flexible sheet of material 78 supported by support frame 76. Flexible sheet of material 78 may be, for example, a canvas material or any other material that will provide support but will also provide some flexibility for comfort of the animal resting upon bed 36. Support frame 76 may comprise a plurality of longitudinal frame members 80 which may comprise left and right side members 82 and 84, respectively, which are essentially identical and rear and forward longitudinal frame members 86 and 88, respectively, which are essentially identical. In a preferred embodiment, side members 82 and 84 are longer than rear and forward members 84 and 86. Each of the frame members 80 has first and second ends which may be connected to the ends of other longitudinal frame members, and each frame member may be a generally cylindrical, hollow tube with flattened ends. Thus, left side frame member 82 has ends 90 with openings 92 therethrough. Right side frame member 84 has ends 94 with openings 96 therethrough. Rear frame member 86 has ends 98 with openings 100 therethrough. Finally, forward frame member 88 has ends 102 with openings 104 therethrough. For ease of reference, openings 92, 96, 100 and 104 will be referred to collectively as frame connection openings 106.

Flexible sheet of material 78 may have pockets 110 at the rear and forward edges 112 and 114 thereof and at the left and right side edges 116 and 118 thereof. Left and right frame members 82 and 84 may be inserted into pockets 110 at left and right sides 116 and 118, respectively, of the flexible sheet of material 78. Likewise, rear and forward members 86 and 88 may be inserted through the pockets 110 at the rear and forward edges 112 and 114 of the flexible sheet of material 78.

It will be understood that the rear and forward frame members 86 and 88 are identical to one another and that the left and right side members 82 and 84 are identical. The numeric designations are given here for ease of reference. Each of the frame members 82, 84, 86 and 88 will extend through pockets 110 so that the ends thereof are exposed which will allow the frame members 80 to be connected to one another through frame connection openings 106 with a fastener of a type known in the art. Base portion 42 may include mounting bosses 120 integrally formed therewith so that screws may be inserted through openings 106 and into the mounting bosses 120 at or near corners 122 of base portion 42 to suspend bed 36 above floor 30. Alternatively, brackets, such as L-shaped brackets or other brackets of a type known in the art may be mounted to base portion 42 and utilized to mount bed 36 in animal house 10. Thus, the same fasteners that connect frame members 80 to one another may be used to mount bed 36 to animal house 10. Frame members 80 may be positioned near enough to walls 15, 20, 32 and 34 to prevent the foot of an animal from slipping between the wall and bed 36. Frame 76 is connected so as to provide a rigid connection to prevent movement of the frame relative to the walls of the animal house. Thus, once frame 76 is connected, it is fixed in position and will not move until the fasteners are removed.

As described herein, animal house 10 may thus be assembled from a kit for assembling an animal house which includes the bed 36, upper portion 44 and base portion 42. Brackets and other hardware that attach bed 36 to animal house 10 may be included. In a disassembled condition, upper portion 44 is nestable in an inverted or upside down position as shown in FIG. 2 in base portion 42. Thus, the tapered walls of upper portion 44 will be received in an opening 124 defined by upper edge 74 of base portion 42 and will be received in base portion 42. Bed 36 may be disassembled into its component parts (i.e., frame members 80 and flexible sheet of material 78, and any necessary fasteners) and may be positioned in base portion 42 so that it may be stored between upper portion 44 and base portion 42 when upper portion 44 is nested therein. The kit as shown in FIG. 2 may be transported as a unit in the nested position so as to take up less space than the assembled animal house 10. Upper portion 44 may be removed from base portion 42, and the bed portion 36 assembled and mounted to base portion 42. Upper portion 44 can then be connected to base portion 42.

Thus, the present invention is well adapted to carry out the object and advantages mentioned as well as those which are inherent therein. While numerous changes may be made by those skilled in the art, such changes are encompassed within the spirit of this invention as defined by the appended claims.

What is claimed is:

1. A kit for assembling a doghouse comprising:
    a base portion, the base portion having a floor;
    an upper portion, wherein the upper portion is removably connectable to the base portion; and
    a bed supportable in the base portion above the floor thereof, so that no portion of the bed contacts the floor when the bed is supported in the base portion, the bed comprising:
        a frame; and
        a flexible sheet of material supported by the frame wherein the frame comprises a plurality of longitudinal frame members having first and second ends, the first and second ends of each frame member being connectable to the ends of another of the frame members, wherein the flexible sheet is supported by the longitudinal frame members.

2. The kit of claim 1 wherein the upper portion is nestable in the base portion in a disassembled condition of the doghouse.

3. The kit of claim 2 wherein the upper portion may be inverted and nested in the base portion with a crest of the upper portion facing downwardly.

4. The kit of claim 3, the bed being positioned between the top of the upper portion and the floor of the base portion when the upper portion is nested in the base portion.

5. The kit of claim 1, the bed being positionable in the base portion in the disassembled condition of the doghouse.

6. The kit of claim 1, wherein the flexible sheet of material comprises a canvas material.

7. The kit of claim 1, wherein the bed is connected to the base portion.

8. The kit of claim 1 wherein the base portion has a support structure extending inwardly from the walls thereof upon which the bed may be supported.

9. An animal house comprising:
   a base portion;
   an upper portion removably connected to the base portion; and
   an elevated bed positioned in the base portion and supported by the base portion so that a space is defined between the elevated bed and a floor of the doghouse such that the bed does not contact the floor, the elevated bed comprising:
      a plurality of longitudinal frame members connected to each other at ends thereof; and
      a flexible sheet of material supported by the longitudinal frame members.

10. The animal house of claim 9 wherein the upper portion is nestable in an inverted position in the base portion when the base portion is disconnected from the upper portion.

11. The animal house of claim 9, the base portion having a plurality of mounting bosses integrally formed therewith, wherein the elevated bed is mounted to the mounting bosses.

12. The animal house of claim 9, wherein the elevated bed is mounted to the base portion with the same fasteners that connect the longitudinal frame members to each other.

13. The animal house of claim 9, the upper portion and base portion being comprised of a plastic.

14. The animal house of claim 9, the animal house comprising an animal house that rests upon but is not affixed to a ground surface.

15. The animal house of claim 9, wherein the base portion has a support structure extending inwardly from a wall thereof upon which the bed is supported.

* * * * *